United States Patent [19]

Steigelmann et al.

[11] 3,892,665
[45] July 1, 1975

[54] MEMBRANE METHOD AND PRODUCT

[75] Inventors: Edward F. Steigelmann, Park Forest; Herman E. Ries, Jr., Chicago; Robert D. Hughes, Park Forest, all of Ill.

[73] Assignee: Standard Oil Company, Chicago, Ill.

[22] Filed: Oct. 15, 1973

[21] Appl. No.: 406,382

[52] U.S. Cl. ............. 210/490; 210/500 M; 264/41; 264/298
[51] Int. Cl. ............................................ B01d 25/16
[58] Field of Search ...... 210/490, 500; 264/41, 216, 264/236, 298

[56] References Cited
UNITED STATES PATENTS

| | | | |
|---|---|---|---|
| 3,031,721 | 5/1962 | Friedlander | 264/298 |
| 3,392,054 | 7/1968 | Sapoff et al. | 264/298 X |
| 3,580,841 | 5/1971 | Cadotte | 210/490 X |

*Primary Examiner*—Frank A. Spear, Jr.
*Assistant Examiner*—Ferris H. Lander
*Attorney, Agent, or Firm*—Morton, Bernard, Brown, Roberts & Sutherland

[57] ABSTRACT

There is disclosed a method of forming membranes on the order of 10–200A (0.001 to 0.01$\mu$) thick, particularly for use in reverse osmosis processes where solvents are caused to flow from a more concentrated solution to a more dilute solution through the membrane. The membrane is formed from a plurality of monomolecular layers of a polymer material alone, and in mixtures, which can be crosslinked, if desired.

22 Claims, 3 Drawing Figures

MEMBRANE METHOD AND PRODUCT

The development of reverse osmosis processes using thin membranes is an outgrowth of early work on osmosis and osmotic pressure measurements, which was primarily concerned with the separation of water from alcohols, sugar, and colloids, and more recently, the purification of saline water. In the latter case, thin membranes of cellulose acetate are the most commonly used. Such membranes, on the order of 0.05 to 0.50 microns (500—5000A) thick, are described in U.S. Pat. No. 3,580,841. The prior art membranes have normally been prepared by various casting methods, e.g., wherein a concentrated solution of polymer forming the membrane is applied on a liquid surface and the solvent is evaporated. Other methods have involved casting the membrane from such solutions onto solid supports such as glass.

The thin membranes of the prior art, while effective for certain separations, have been limited in their use for a number of reasons, chief amongst which has been that it is very difficult to obtain membranes of reproducible thickness, the more so the thinner the membrane. Also the membranes have been relatively thick and, accordingly, the transfer rates through the membrane achieved using them have been slow and not of commercial interest. The transfer rate through the membrane is inversely proportional to the thickness of the membrane. In saline water purification, transfer rates on the order of 2 to 50 gallons of water per square foot of membrane per day are typical.

In accordance with the present invention, ultrathin membranes are produced from a monomolecular film of a polymeric material by transferring a plurality of such film layers onto a support. These membranes are thinner than the prior art membranes by several orders of magnitude. The membranes of this invention can be on the order of 10 to 100A, or 200A, thick, and transfer rates in saline water purification using cellulose acetate membranes produced in accordance with this invention, on the order of 100 to 200 gallons of water per square foot of membrane per day may be achieved.

The ultrathin membranes of the present invention differ from prior art membranes in at least three aspects. First, they are thinner than the prior art membranes by several orders of magnitude. Membranes described in the prior art, e.g., U.S. Pat. No. 3,580,941, are on the order of 0.05 to 0.50 microns (500—5000A) whereas the ultrathin semipermeable membranes of the present invention can be on the order of 0.001 to 0.01 microns (10—100A), or 0.02 microns in thickness. Secondly, the ultrathin membranes of the present invention are produced in layers, each only a molecule thick; and in each layer the molecules are oriented in specific fashion so that each layer has a regular, known structure. The prior art membranes, in contrast, are produced with the molecules arranged in a random fashion and the polymeric molecules are intertwined. The orientation of the molecules in the layers forming the membranes of the present invention will produce varied effects such as improving the permeability, diffusivity and selectivity of the membrane. Such effects have been shown heretofore, for example, by comparison of atactic and isotactic polypropylene. Thirdly, the ultrathin membranes of the present invention are essentially flawless, that is, they provide an essentially continuous surface and contain few, if any, voids, because they are produced in several layers each containing a single layer of tightly packed molecules.

The membranes of the present invention are produced by establishing a monomolecular film of the desired film-forming material on a liquid surface such as water and compressing the film so that the molecules are tightly packed together and cover the liquid surface as a continuous layer. Thereupon, a support is passed through the continuous monomolecular film so that a monomolecular layer of the material is deposited as a continuous surface upon the support. As the support passes through the film, an essentially constant surface pressure is maintained on the film to maintain its continuous surface and uniformly apply the material to the support. Since the molecules are transferred to the support under pressure in the film, they are under a pressure on the support which freezes in the monomolecular layer the orientation of the molecules in the film. The material used to form the monomolecular film can be monomeric, or polymeric material. Monomers can be polymerized on the surface of the liquid, or after being deposited on the support. Polymers can be cross-linked to strengthen the membrane either before, or after, transfer of each monomolecular layer to the support or after a film of several layers has been applied to the support. Normally, the support will be dipped into the liquid upon which the film is formed so that it moves through the film with an in-and-out movement. Some polymers, and monomers, prefer to transfer to the support as it is immersed whereas others transfer as the support moves in both directions through the film. With the latter materials a layer two molecules thick will be provided as the support is dipped into and removed from the liquid.

There are available a large number of film-forming materials which can be fabricated into the ultrathin membranes of this invention. In general, such materials are polymerizable monomers and polymers which are capable of forming a monomolecular film on the liquid surface and are insoluble in the liquid upon which the monomolecular film is established. Because water is the most common liquid used, the materials are generally water insoluble. However, films of water-soluble polyvinyl alcohols, for example, can be produced by forming the monomolecular film on a salt solution, e.g., NaCl, etc. solution having a sufficient salt concentration, usually greater than 10% wt., to make the film-forming material insoluble in it. If desired, various hydrocarbon solvents such as benzene or hexane can be used where the film-forming materials are watersoluble. Mercury can also be used as the liquid. Since water is the most common liquid used, the polymeric materials will be more specifically discussed hereinafter with regard to water, although it is to be understood that when another liquid is used to support the monomolecular film, the criteria for selection of the polymeric material and liquid are the same.

The film-forming materials, although essentially water-insoluble, do have a polar hydrophilic, chemical group in addition to a hydrophobic, e.g., hydrocarbon structure that is sufficiently large to make the material essentially insoluble in water. The hydrophilic group must have sufficient attraction to water so that the molecule is attracted to, or attached to, the water surface, but the attraction cannot be so strong as to dissolve the material. Suitable hydrophilic groups include hydroxyl, sulfate, sulfonic, carbonyl, carboxylic, phosphate, phosphoric, acetate and ether and ester linkages. Hydrocarbon chains are the most common hydrophobic group. Although in many instances, a single hydrophilic group may not have sufficient attraction to water, molecules containing a number of such hydrophilic groups, either of the same or different type, can be used. In general, the film-forming material must have sufficient attraction to water so that the material will spread as a monomolecular layer. Suitable materials which form monomolecular films will include thermoplastic or elastomeric polymers of polysaccharides, silicon polycarbonates, epoxy resins, acrylonitriles, polyamides, polyacrylics, polycarbonates, polyvinyl esters, polyvinyl alcohols, polypeptides, polysulfones and others. As mentioned, the material can be a polymerizable monomer, e.g., of the previously mentioned polymers, with the monomer being polymerized on the liquid surface or on the support. Specific monomers suitable as film-forming materials include the diglycidyl ether of bisphenol A, hexamethylene diamine and adipic acid, 2-hydroxystearic acid, methyl methacrylate, lauryl methacrylate, acrylonitrile, vinyl acetate, vinyl stearate, ethyl methacrylate, styrene sulfonic acid, amino acids, etc.

Polysaccharide esters comprise a preferred group of materials. Specific preferred materials for saline water conversion include cellulose acetate, cellulose diacetate, cellulose triacetate, guar triacetate, locust bean gum triacetate, beta-glucan triacetate, xylan diacetate, methyl cellulose acetate, methyl cyanoethyl cellulose, cellulose acetate lactate, and cellulose acetate methoxy acetate.

Additional film-forming materials suitable for use in this invention are: agar acetate, amylose triacetate, beta flucan acetate, cellulose acetate acetaldehyde dimethyl acetal, cellulose acetate ethyl carbamate, cellulose acetate methyl carbamate, cellulose acetate ethyl oxalate, cellulose acetate methyl sulfonate, cellulose acetate propionate, cellulose acetate p-toluene sulfonate, cellulose diacetate acetyl lacetate, cellulose diacetate ethyl oxalate, cellulose diacetate methoxyacetate, cellulose nitrate, cellulose nitrate methane sulfonate, cyanoethyl cellulose, ethyl cellulose dimethyl sulfamate, ethyl cellulose methane sulfonate, guar acetate, hydroxyethyl cellulose triacetate, hydroxymethyl cellulose triacetate, hydroxymethyl cellulose triacetate, and cylan diacetate. Further, mixtures of cellulose acetate with acetylated hydroxyethyl cellulose, cellulose acetate with sucrose octaacetate, cellulose triacetate with sucrose octaacetate, and cellulose triacetate with xylane diacetate are suitable. Suitable film-forming materials in addition to the polysaccharides include polyvinyl formal, polyvinyl acetate, copolymers of vinyl chloride and vinyl acetate, proxylin, starch, the block copolymer of poly dimethylsiloxane and poly [2,2-propanebis (4-phenyl carbonate)], poly (phenyl glycidyl ether), polyacrylonitrile, poly (hexamethylene adipamide), poly methyl methacrylate, poly [2,2-propanebis (4-phenyl carbonate)], polyvinyl alcohol, poly (B-alanine), poly (hexamethylene sulfone), and others.

The function of the support upon which the membranes of this invention are formed is to protect the membrane. In general, the support should be porous and have a pore size at the surface in contact with the membrane small enough to support the membrane and, at the same time, large enough to permit flow through the support, e.g., of water in saline water conversion. Pore sizes in the support are generally above about 25A and smaller than about 50,000A(5μ). The shape of the support is not critical; however, hollow fibers are particularly effective supports. Porous cellulose acetate fibers or any other porous fibers, porous ceramic tubes, porous glass or Vycor, porous stainless steel, or thin membranes such as "Selas," "Millipore" or "Nucleopore" type membranes can be used. The "Selas," "Millipore" and "Nucleopore" membranes are examples of various commercially-available fine filter membranes produced with controlled porosites for the purpose of filtering colloids, bacteria, etc. These membranes are produced from cellulose acetate resins, nylon, "Teflon" or polyvinyl chlorides and have pore sizes of about 25A and higher and include filters such as type VF and VM Millipore filters which are fabricated from a mixture of cellulose nitrate and cellulose acetate and commercial cellulose triacetate filters such as Gelman Matrisel GA-10. Metallic membranes of silver and other materials such as those made in accordance with U.S. Pat. No. 3,287,112, and porous glasses and ceramics also are suitable support materials.

The membranes can be formed directly on the porous support or on a solid support and then transferred to the porous support. One method involves filling the pores in the porous support with a soluble material to create a non-porous support before the membrane is formed and then removing the material after the membrane is formed to re-create the porous support. Alternatively, the membrane can be formed on a non-porous support and transferred by a variety of techniques to a porous support.

Deposition of the monomolecular layers on a non-porous support has some major advantages over use of a porous support, such as uniformity, no bridging of pores required, etc. Experience has shown that it is difficult to build-up certain polymer membranes directly on a porous support using the technique of this invention especially where the pores are large. Apparently, the monomolecular layers are so thin that they lack sufficient strength to bridge the pores in the porous support, but a film 10 to 200A thick once formed on a non-porous support has more strength to bridge these pores. Some minor disadvantages, however, may be weaker attachment to the porous support after transfer and the requirement of a two-step process. The ability to use either porous or non-porous supports allows great freedom in the choice of film-forming compounds. Moreover, the use with non-porous supports of mixed films, greater surface pressures for transfer, and crosslinking before or after transfer, can overcome these minor disadvantages in using a non-porous support.

Essentially, the procedure for using a non-porous support is the same as with the porous support and involves building-up in a controlled manner an ultrathin membrane of the desired number of monomolecular layers on a non-porous support, such as glass, etc. If desired, the film may be crosslinked. The membrane is then floated-off the non-porous support onto a liquid surface. Carnell and Cassidy described such a technique for Parlodion films on glass plates [Carnell, P. H., and Cassidy, J. G., J. Polymer Sci., 55, 233 (1961)]. Finally, using the Langmuir-Blodgett technique, the film can be picked up from the liquid surface and become attached to a porous support of choice. Floating the membrane off the non-porous support can be facilitated by preparing the membrane on a soluble solid support, such as polyethylene, and then immersing the support in a suitable solvent, e.g., toluene, so that just enough of the support dissolves to free the film, which then can be floated onto the solvent surface. Any polymer backing such as polyamides, polyesters, polyacrylics, polycarbonates, etc., may be used so long as it has a solubility in a solvent which does not dissolve the membrane. Nonpolymeric materials may be used in place of polyethylene and have some advantages. For example, methyl stearate and related esters, etc., that are not chemisorbed form physically adsorbed layers (monolayers) on glass or metal and can be removed by a variety of solvents. Such nonpolymeric materials have advantages in uniformity and ease of removal. Further, water-soluble materials, e.g., carbowaxes, inorganics, higher alcohols, etc., also are suitable.

The membranes of this invention and their method or production will be described more fully hereinbelow with reference to the attached drawings in which.

Figure 1:
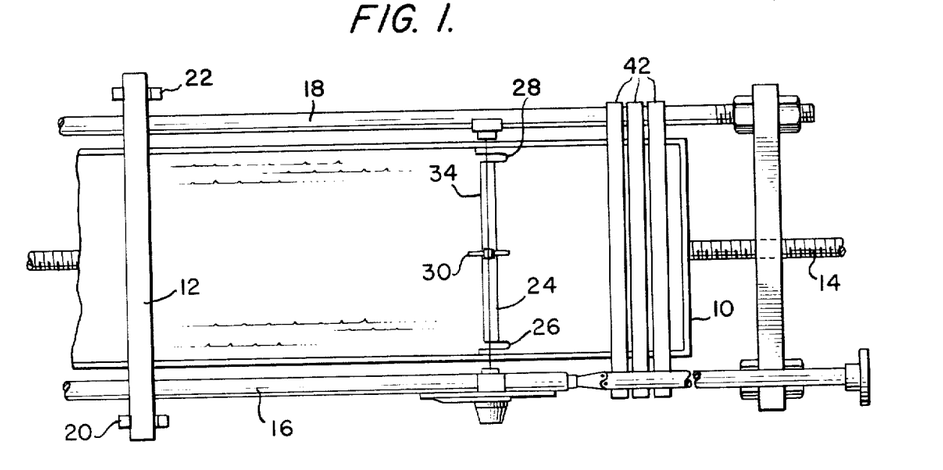
FIGS. 1 and 2 illustrate apparatus for use in producing the monomolecular films of this invention and are, respectively, a top plan and a side-elevation of the apparatus.
Figure 2:
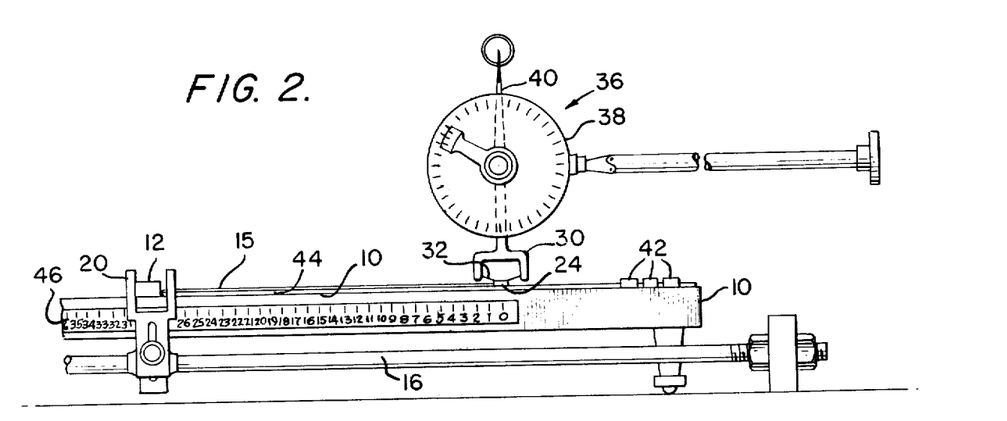

The apparatus of FIGS. 1 and 2 has a shallow trough 10 filled with water, or other liquid, on which the monomolecular film 15 is spread. A compression barrier 12 laid across trough 10 on the upper edges 10' thereof behind the monomolecular film, generally designated by numeral 15, is driven on guide shafts 16 and 18 by a precision screw 14, through yokes 20 and 22. Compression barrier 12 is made to push the leading edge of the monomolecular film against a delicately suspended barrier 24 which floats on the water surface 44 above edges 10'. The floating barrier 24 as shown is a strip of mica attached to the sides of trough 10 by thin, flexible platinum foils 26 and 28 and to an aluminum stirrup, or yoke 30 by an unspun silk fiber 32. Stirrup 30 is fixed to a calibrated torsion wire 34 that indicates the surface pressure on scale 36, including dial 38 and indicator 40. Scale 46 on the side of trough 10 is calibrated to read the area of film 15, defined by the sides of trough 10, barrier 24 and barrier 12. Sweeping barriers 42, e.g., small brass bars, are used for sweeping the water surface free of contamination prior to establishing the monomolecular film.

Monomolecular film 15 is established on the water surface by depositing a few drops of a dilute solution, e.g., containing about 0.005 mg. to 0.05 mg., preferably about 0.01 mg., of the film-forming material in a volatile solvent such as benzene or hexane. Many materials such as some epoxides, cetyl alcohol, stearic acid, polyamides, etc., can be applied without benefit of the solvent; however, use of a solvent is preferred because of ease of manipulation. The amount of compound deposited is precisely measured so that the number of molecules present can be calculated from the known molecular weight of the material. Upon evaporation of the solvent, the material because of its hydrophobic and hydrophilic character forms a film one molecule thick on the surface between the barrier 12 and float 24 in which each molecule is oriented with the hydrophilic group toward the water. The orientation of the molecules in the monomolecular layer is a function of the attraction of the hydrophilic group, or groups, to the water surface and the repelling nature of the hydrophobic group. As the surface pressure is applied to the molecules on the water surface, they align themselves by reason of this attraction, and repulsion, and the surface pressure packs them together in this aligned fashion. The initial area between barrier 12 and floating barrier 24 is large enough to allow the molecules ample room to move freely on the surface.

Before the film-forming material is deposited, the entire apparatus is thoroughly cleaned and coated with a material (not shown) that water does not wet, such as a high melting paraffin wax or Teflon. Since water does not wet such materials, the water surface has a downward curvature and can be raised higher, shown by layer 44, than the edges 10' of the trough 10 to interpose the monomolecular film 15 between barrier 12 and barrier 24. This height is necessary if sweeping barriers 42 are to be effective in removing contaminants and monomolecular film 15 is to be contained and controlled in the defined area. Since contamination and vibration can affect formation and stability of a monomolecular film, the device is mounted (not shown) to minimize vibration and is contained in a temperature controlled environment (not shown).

Initially, because of the relatively large surface area of the water as compared to the amount of film-forming material deposited thereon, the molecules of the film-forming material are randomly oriented on the surface of the water and there are large open areas between molecules or groups of molecules of the material of the surface. In forming the monomolecular film 15, however, compression barrier 12 is moved toward barrier 24 and the surface area between the two barriers is reduced, preferably in small decrements, so that the molecules begin to become oriented under the increased compression with their hydrophilic groups directed toward the water surface and the hydrophobic groups directed away from the surface. Simultaneously, the open voids in the film are reduced in size.

Area and pressure readings are taken on scales 36 and 46 simultaneously with formation of the monomolecular film. The pressure of monomolecular film 15 on floating barrier 24 is balanced by twisting of torsion wire 34 to which the floating barrier 24 is attached. The degree of twistiing shown for scale 36 is a measure of the surface pressure which is expressed in dynes per centimeter. Compression is continued until the desired pressure for transfer of the monomolecular film is attained.

There are two pressures of significance in the formation of the monomolecular film. The maximum pressure suitable is referred to as the "collapse pressure" and it is the pressure at which the monomolecular film collapses or buckles. Collapse probably takes place in four main stages. In the weakening state the surface pressure forces some of the oriented molecules up from the water surface. The cohesion between the hydrophobic groups, e.g., long hydrocarbon chains, and the mutual attraction of the hydrophilic or polar groups are great enough to cause the molecules to rise in the second state, one after the other, in closely packed folds or ridges two molecules thick. Although films can be produced in accordance with this invention at such pressure, it is apparent that with such folding or ridging, the thickness of the film can vary from one to several molecules. Moreover, adhesion of the transferred polymers to the porous support (and to neighboring molecules) may be relatively weak. In the third state this double-layered ridge bends and apparently breaks. At the collapse pressure, fragments, two or more molecules thick, fall over upon adjacent areas of the monomolecular layer. The collapse pressure reflects both the strength with which the film adheres to the surface of the water (i.e., the strength of the polar group) and the strength of the cohesive forces. The stronger the polar group, the more tightly it adheres to the surface of the water; the greater the cohesive forces, the stronger the film. Accordingly, it is most desirable to use film-forming materials with high collapse pressures. Many of the film-forming materials discussed above, however, have polar groups of only intermediate strength or polarity. Thus, collapse pressures are relatively low and transfer of the film to the support must be performed at low pressures. It has been found that use of mixtures of various film-forming materials can increase the collapse pressure. For example, strong film-forming compounds such as compounds having long hydrocarbon chains with a strong polar group at one extremity can be mixed with the polymer materials before spreading on the liquid surface. The mixed film has a much higher collapse pressure than the polymer alone (in some cases, higher than either component), and transfer is facilitated. More importantly, the adhesive strength of these strong polar groups and the cohesive forces between the long hydrocarbon chains strengthen and stabilize the film, before, during, and after transfer. Membranes of reduced thickness can, thus, be made more durable. In general, the added film-forming compounds can be used in amounts of several parts, e.g., 3 or 4 parts by weight per part of polymer; however, 0.1 to 2 parts per part by weight polymer are more typical. In each instance, a sufficient amount is used to improve the film characteristics, as desired, without adversely affecting the membrane. The vertically oriented $C_{19}$ to $C_{40}$ carboxylic, sulfonic or phosphonic acids, e.g., stearic acid, octadecyl phosphonic acid, etc., are suitable. Other desirable mixtures of film-forming materials would include the polymer plus $C_{26}$ to $C_{36}$ fatty acid or 2-hydroxystearic acid. Double bond containing materials such as oleic acid can be used in mixed films to provide added flexibility in the resultant mixed film.

The minimum pressure suitable for use in this invention is the pressure sufficient to cause the monomolecular film to form a stable film, i.e., to form a continuous, two dimensional phase and to be transferred. At low pressures, the film is inhomogeneous and composed of islands of irregular size and shape, generally considerably less than one micron in their largest dimension. The collapse pressure, in general, is the maximum desired pressure.

The minimum and maximum pressure suitable for use in forming film from the different monomeric and polymeric membrane-forming materials will vary considerably. In general, however, pressures between about 2 to 80 dynes per centimeter, preferably about 10 to 70 dynes per centimeter are suitable. The specific pressure range to be employed with a particular film-forming material is easily determined by plotting pressure versus area measurements (scales 36 and 46, FIGS. 1 and 2) using the material in question. Film compressibility is related to the slope of the curve. The collapse pressure is shown by a constant pressure or a fall in the pressure with a decrease in area. The slope of the curve shows the decrease in area with increase in surface pressure and thus indicates the compressibility of the monomolecular layer. Because the number of molecules present in the monolayer is known, the average area within which each molecule is free to move at successive points on the curve is easily calculated and extension of a line from the steepest part of the curve to zero pressure gives a cross-sectional area of the molecule. From these data, the pressure at which a continuous surface is formed is readily determined.

The minimum desired compression pressure can also be defined as the pressure at which there is quantitative transfer of the monomolecular film to the support. Below this pressure of quantitative transfer, the monomolecular film is not homogeneous. The specific pressure for quantitative transfer is easily determined since the support has a known surface area and the surface area of monomolecular film 15 is also known. If the decrease in surface area of film 15, resulting from the transfer, is less than the surface area of the support passed through the layer, at constant pressure on the film, then obviously the layer on the support covers less than 100% of the support and the layer is not continuous. Suitable pressures for use in this invention are those from the pressure at which a continuous surface is formed and can be transferred as a continuous film to just below the collapse pressure. A good working pressure is between, e.g., midway these pressures. In this invention, the desired compression pressure is preferably maintained essentially constant as the support is dipped into trough 10 so that the packing of the monomolecular film is uniform.

While membranes having one molecular layer can be produced in accordance with this invention, the membranes of this invention are produced preferably by depositing a desired number of monomolecular layers of thee material onto the support, e.g. a number sufficient to give reasonable strength and durability, usually not less than five. Membranes have been made with one hundred layers. Each of the layers is transferred as described above and, preferably, the same constant transfer pressure is used for the transfer of each layer. In transferring succeeding layers to the support, however, difficulties can be experienced in obtaining uniform layers and a point can be reached where no additional layers can be transferred. It is theorized that when the support is removed from trough 10, a layer of water is trapped between the film-forming material and the monomolecular layers already attached thereto. Accordingly, it is usually desirable to dry each layer after it is deposited on the support by subjecting the layer to a mild heat treatment for a sufficient time to dry it, e.g., up to several minutes. Drying temperatures of about 40° to 90°C., preferably about 50° to 70°C., for times of up to about 30 minutes, preferably about 2 to 10 minutes, are suitable. Such treatment permits formation of membranes with multiple layers without difficulty.

As mentioned above, it is desirable to be able to crosslink the films to be used as membranes in order to reduce their solubility in common solvents and to improve their strength. Strength of the film and insolubility of the films are necessary to insure a long membrane life. Because of the small amount of material which makes up an ultrathin film, even a slight solubility would lead to eventual membrane failure. Crosslinked ultrathin films are stronger and less soluble than uncrosslinked films. The extent that one may crosslink the ultrathin films which are produced according to this invention is, however, limited because the material in the monomolecular film is essentially two dimensional. Crosslinking must also occur under relatively mild conditions, i.e., at relatively low temperatures and pressures, lest one destroy or seriously weaken the ultrathin films. Crosslinking can be achieved by any suitable method which does not destroy the films. Thus the films may be crosslinked by reaction with polyfunctional chemical reagents; heat curing; acid, base, or radical induced secondary polymerization; or irradiation of the films with visible, ultraviolet, or X-ray radiation. Perhaps the simplest method of crosslinking is heat curing which is effective, for example with certain nylon and epoxy resins. Acid or base catalyzed crosslinking can be used to crosslink alkylalkoxy Nylons (such as the Belding Nylons No. 808, 809, 818, 819, or 829). These may be cured with p-toluene sulfonic acid, citric acid, succinic acid, etc. Similarly, a basic diamine can be used to cure an epoxy resin. Polyethylene and polyamides can be crosslinked with x-rays. Ultraviolet light can be used to cure polymethyl methacrylate, polyethylmethacrylate or polyamides.

Another method of crosslinking is to react a volatile crosslinking agent with a film containing a non-volatile monomer. In this procedure, the monomer is deposited on the support as a monolayer, and after a number of monolayers have been builtup, the monomer is crosslinked. The crosslinking agent may be a volatile amine, diamine, alcohol, acid, acid chloride, mercaptan, etc., or mixtures of the same in a non-volatile monomer structure. Ammonia, propanediamine, ethylene glycol, hydrogen chloride, succinoyl dichloride, methyl mercaptan are all volatile crosslinking agents.

In still another process an uncrosslinked film, many monolayers thick, is deposited on a porous support. The film can be composed of polymers containing such groups as —OH, —NH₂, —OR, etc., or even just tertiary or other reactive hydrogens. The symbol,⊤, represents the polymer backbone to which these groups are attached. To crosslink these polymers to form a strong membrane, a volatile, reactive material like PCl₃, or S₂Cl₂ is reacted with these groups to form, for example,

With tertiary hydrogens as the only reactive sites, oxygen needs to be added to the reacting mixture to produce the same adduct,

With a sufficient concentration of reactive sites, crosslinking occurs through the formation of bridges. If not, a second volatile compound like a diamine, tetramine, glycol, etc., such as propane diamine, ethylene glycol, glycerol, diethylenetriamine, tetramino benzene, and others, can be added to effect crosslinking. These compounds could be expected to react in the following manner:

A variation of this process is to crosslink a monomolecular film on the water surface, transfer many monomolecular layers to a porous support, and finally crosslink the film again to produce a strong, thin membrane. Such a process requires that the starting material have at least two different reactive functions such as an epoxy resin which contains both and —OH, i.e., Epon 828. In the first step, the film is spread and crosslinked to form a two-dimensional network. For an epoxy resin, a diamine such as propane diamine can be injected into the water beneath the resin. The diamine reacts with the to produce the two dimensional network. The film is then transferred to the porous support, the film is crosslinked a second time with, for example, maleic anhydride, to provide a strong, three-dimensional network. This reaction can be effected by the process described above. In this case the —OH groups in the epoxy resin can be reacted with PCl₃ and then with a volatile diamine, tetramine, glycol, etc., to produce the strong, three-dimensional membrane. Bridges between the —OH sites may look like the following:

Similarly, unsaturated diacids can be first crosslinked through the double bond and then later by forming polyester linkage through the acid functions. Unsaturated diamines or diols can be first polymerized through the double bond then later cross-linked by treatment with diacid chlorides to give polyamide and polyester linkages, respectively.

The following examples serve to further illustrate this invention.

EXAMPLE I

Two membranes of 25 and 15 monolayers, respectively, of General Electric XD-1 Resin (also known as MEM-213) on an Amicon XM-150 filter surface (pore size ≈ 35A) with an area of 4.9 cm.² were prepared. XD-1 is a block copolymer of dimethyl siloxane and the condensation product of bisphenol A and phosgene and has a molecular weight of approximately 15,000. Transfers were carried out on a water surface as described above at 30 dynes/cm. pressure on the film. To the surface was applied 0.25 ml. of a 0.03 wt. % solution of XD-1 in benzene for the 15 monolayer film and 0.35 ml. for the 25 monolayer film. Transfer occurred in both directions. Immersion was done at about 4 in./min. and emersion at 1 in./min. Between dips, the film and support were heated by a 25 watt lightbulb at 70 volts for two minutes. The bulb was 1 to 3 inches from the film. Each membrane was tested for its permeability to air. The coated filters were less than 1/20th as permeable to air as the uncoated filter. This decrease in permeability indicates that the pores in the support were bridged by the film. In a separate experiment an approximately 1% solution of trifalgic acid ($C_{131}H_{113}N_9O_{33}S_{12}$, molecular weight = 2910) in water was passed through the coated filters under 7 to 10 psi of air. Analysis of the visible spectra of the filtrates revealed that 87% of the trifalgic acid was rejected by each of the filters. The retentate showed a corresponding enhancement in the concentration of the trifalgic acid further demonstrating the existence of a semipermeable membrane.

EXAMPLE II

In preparing the membranes 40 monomolecular layers of XD-1 resin (0.6 ml. of the solution of Example I) were transferred to an Amicon PM-10 filter (about 18A pore size) with an area of 4.9 cm.² at a film pressure of 10 dynes/cm. Transfer occurred in both directions and the film was about 200A thick. For contrast and comparison, two thick (about 0.2 and 0.6 mil) XD-1 films were prepared using the conventional film casting technique. The 0.2 mil. (50,800A) XD-1 film was made by casting onto a clean 4 in. by 8 in. glass plate a 40% XD-1 in chloroform solution with a 0.5 mil. doctor knife and allowing the film to dry. The 0.6 mil. (152,400A) film was made in a similar manner from a 10% XD-1 in chloroform solution with a 6 mil. doctor knife.

Figure 3:
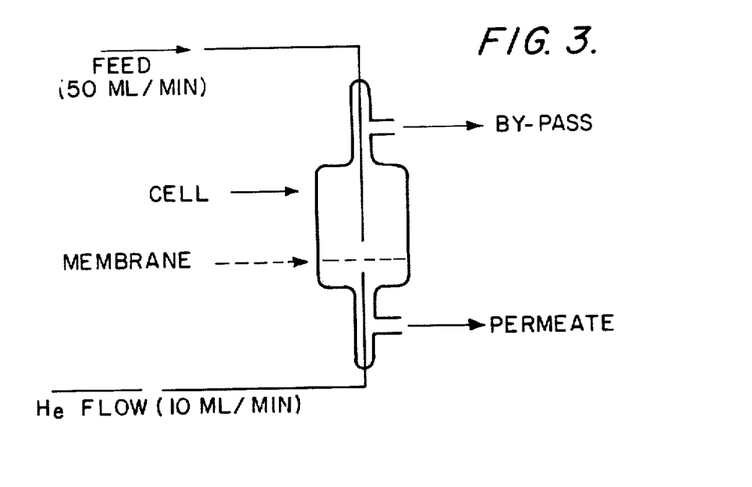
FIG. 3 illustrates apparatus for testing the membranes of this invention.

The thick and the thin films were tested in the apparatus shown in FIG. 3. Each of the membranes was put in the test cell, and a feed consisting of 43.8% ethylene, 30% ethane, and 26.2% methane passed over the membranes. Depending on the membrane, various cell pressures were employed. To maintain a constant composition of the gas mixture in the cell, the gas mixture was flowed through the cell at the rate of 125 ml./min. Gas flowing through the membrane was picked up in a He stream. (10 ml./min.). The composition of the gases passing through the membrane as well as their flow rate was determined with gas chromatography. Flow through the membrane can be calculated by knowing the amount of hydrocarbon in the He carrier gas, the He flow rate, the size of the sample and the response of the G. C. detector to one ml. of the gas mixture. For convenience, the sensitivity of all the gases is assumed to be 1.00.

The results, shown in Table 1 confirm that the thin and the thick membranes both fractionate the gas mixture about equally, but the thin membrane shows a large increase in the rate of flow through the membrane.

TABLE I

| Membrane | EFFECT OF FILM THICKNESS IN GAS PERMEATION | | | | | |
|---|---|---|---|---|---|---|
| | Permeate Composition (%) | | | Pressure on Membrane (psi) | Flow Through Membrane (ml/min) | Flow (Calculated) at 10 psi (ml/min) |
| | Methane | Ethylene | Ethane | | | |
| 0.6 mil XD-1 | 14.0 | 50.2 | 36.3 | 50 | 1.2 | 0.24 |
| 0.2 mil XD-1 | 18.1 | 47.6 | 34.1 | 75 | 32.2 | 0.43 |
| Monomolecular layered XD-1 | 20.1 | 48.0 | 31.8 | 0.54 | 0.76 | 14.1 |

EXAMPLE III

In this Example, 4.5 × 10⁻⁴ grams of Epon 872 (Shell epoxy resin) was spread on a water surface. Epon 872 is an aliphatic modification of the digylcidyl ether of bisphenol A. The resin, a very viscous semisolid, is relatively free of impurities and has a molecular weight (Mn) of about 1300. The film was compressed to 12 dynes/cm. for transfer to a support. The support was a Millipore Teflon filter (2.5 cm. in diameter with 5μ holes) and transfer was made by dipping the filter in and out of the water, having the film on its surface. With each dip a resin monolayer can be transferred to the filter. Two different experiments were used to demonstrate the effectiveness of a mild heat treatment in assisting buildup of multiple layers on the support. In one procedure the filter was dipped in and out of the film 12 times without stopping. In the other procedure, the filter was dipped in and out of the film once and then heated for two minutes next to a 25 watt light bulb. This procedure was repeated 11 times. The same filter was used in both demonstrations. Prior to these demonstrations, about 100 monolayers of the resin had been built-up on the filter surface. For this resin, transfer occurs only as the filter is removed from the layer.

The following table gives the average area transferred for each condition.

TABLE II

| Average Area of Resin Transferred to Filter per Dip | |
|---|---|
| Without Heating | 10.0 cm²* |
| With Heating | 17.1 cm²* |
| Calculated Area of Filter | 14.1 cm² |

*A portion of the resin transferred is transferred to the support for the filter.

The results show that without heat treatment, less than a monolayer is transferred per dip whereas with heating, at least a full monolayer is transferred.

EXAMPLE IV

An equiweight mixture of epoxy resin, Epon 872, and stearic acid gave well-behaved films that collapsed at pressures considerably above that for stearic acid alone. The films were spread using benzene and at temperatures of about 25°C. by the transfer technique described above in Example I. The resin alone collapses at about 16 dynes/cm.; stearic acid collapses at 43 dynes/cm. The mixture collapses well above 16 dynes/cm. and in some experiments the collapse pressure was above that for stearic acid. Collapse pressures of 48 to 58 dynes/cm. have been obtained with the mixture. The stearic acid film has an extrapolated area of 0.43 m²/mg. which corresponds to a thickness of about 25A. The resin film has an extrapolated area of 0.89 m²/mg. which corresponds to a thickness of about 10A and the isotherm of the film from the mixture has two pressure portions which extrapolate respectively to 0.78 and 0.21 m²/mg.

An 80 layer transfer of the equiweight mixture monolayer from a water surface to both sides of a Selas Flotronics Support (100% Ag, 25 mm. diam., 50μ. thickness, 0.2μ pore diameter) gives a 35% reduction in permeability (air flow). Transfer occurs on both immersion and emersion and the layers adhere well without the application of heat.

Table III presents data determined for binary mixtures of Epon 872 with polyvinyl acetate (molecular weight about 1 million), stearic acid, 2-hydroxystearic acid, and cholesterol (m.p. 148.5°—149.5°C.). The latter four materials represent three widely different molecular geometries and four types of polar groups.

The extrapolated area, collapse pressure, and compressibility for the epoxy resin are considerably smaller than those for PVAc. Duplicate isotherms for the equiweight mixture of the epoxy and PVAc are in excellent agreement. Slight interaction of the two components is indicated when the film is subjected to higher pressures in the neighborhood of 16 dynes/cm. The small interaction between Epon 872 and PVAc is undoubtedly related to the relatively weak polar groups of both materials as well as to the restrictions imposed by their horizontal orientation. The apparent compatibility (little cooperative or interfering interaction) of these two materials in monolayers is of special interest because of their differences in structure and molecular weight.

The mixed film of Epon 872 and stearic acid gives an isotherm with two steep linear portions. The low-pressure and high-pressure portions extrapolate respectively to 0.78 and 0.21 m²/mg; corresponding compressibilities are 0.0170 and 0.0013. The latter value is smaller than that for stearic acid alone and for its mixed film with PVAc. Area values at high-surface pressures, when corrected for concentration, closely approach those for stearic acid alone. Isotherm steepness (compressibility) also indicates that stearic acid dominates the film in this region. More striking, however, is the collapse pressure for the mixture. The collapse is 48 dynes/cm. but values as high as 59 dynes/cm. have subsequently been observed. These pressures are higher than those for either component alone. There are several advantages in this type of mixed film for membrane preparation. Because of the unusual stability and high collapse pressure, such films may be transferred at a higher pressure than the epoxy resin alone and thus yield stronger, more tightly packed and more reproducible films on porous supports. The tighter packing and higher pressures also will facilitate quantitative transfer.

Pressure-area isotherms for Epon 872, 2-hydroxystearic acid, and their equiweight mixture, show that 2-hydroxystearic acid is similar to stearic acid except that it has a higher collapse pressure, 57 dynes/cm., compared to 42 for stearic acid. Collapse of the mixture at 58 (to 61) dynes/cm. is only slightly above that for the 2-hydroxy compound, but this represents a major increase over the epoxy resin alone. Spreading of the mixture without benefit of solvent and considerable flexibility of the film are possible.

Isotherms for the equiweight mixture of Epon 872 and cholesterol, as well as for the two components, show an apparent lack of strong interaction between the materials which is of special interest because of the major differences in structure between cholesterol and the stearic and 2-hydroxystearic acids. Cholesterol not only has a much weaker polar group (hydroxyl) than the acids but it has a far bulkier ring structure. In spite of the apparent film-forming handicaps of cholesterol (weak polarity and bulky structure), it gives an extremely stable monolayer that collapses at 43 dynes/cm. and it has a compressibility considerably smaller than those for the other materials discussed above. The film properties of cholesterol are consistent with its importance in the structure and behavior of cell membranes and in other physical-chemical and biological phenomena.

TABLE III

MONOLAYER PROPERTIES OF COMPONENTS AND THEIR BINARY MIXTURES

| | Area, m²/mg* | Collapse Pressure dynes/cm. | Compressibility cm/dyne** |
|---|---|---|---|
| | Individual Components | | |
| Epon 872 | 0.89 | (16) | 0.0204 |
| Polyvinyl acetate (PVAc) | 1.90 | (23) | 0.0252 |
| Stearic acid (SA) | 0.43 | 42 | 0.0019 |

TABLE III – Continued

MONOLAYER PROPERTIES OF COMPONENTS AND THEIR BINARY MIXTURES

| | Area, m²/mg* | Collapse Pressure dynes/cm. | Compressibility cm/dyne** |
|---|---|---|---|
| 2-Hydroxystearic acid (2-OHSA) | 0.39 | 57 | 0.0025 |
| Cholesterol | 0.62 | 43 | 0.0012 |
| *Equiweight Mixtures* | | | |
| Epon 872 and PVAc | 1.62 | (24) | 0.0309 |
| Epon 872 and SA | | | |
| Low-pressure region | 0.78 | (18) | 0.0170 |
| High-pressure region | 0.22 | 48(58) | 0.0013 |
| Epon 872 and 2-OHSA | | | |
| Low-pressure region | 0.86 | 18 | 0.0171 |
| High-pressure region | 0.22 | 58(61) | 0.0031 |
| Epon 872 and Cholesterol | | | |
| Low-pressure region | 0.75 | 17 | 0.0129 |
| High-pressure region | 0.32 | 44 | 0.0023 |

*Extrapolated area at zero pressure.
**Compressibility is $(a_o-a_1)/a_1f_1$, where $a_o$ is the extrapolated area at zero pressure and $a_1$ is a smaller area at pressure $f_1$.

Membranes of multiple monolayers, prepared as described in Example 1 from the PVAc and equiweight mixtures described, are useful as ultrathin membranes. The maximum thickness is that desired, although the process is especially adapted to producing ultrathin membranes. Useful ultrathin membranes of 10 to 40 monolayers are prepared by the process described in Example 1 using as the polymer polyvinyl formal; poly [2,2-propane bis (4-phenyl carbonate)]; poly (phenyl glycidyl ether); polyacrylonitrile; poly (hexamethylene adipamide); poly methyl methacrylate; poly (B-alanine); or poly hexamethylene sulfone. The monomers of lauryl methacrylate and vinyl acetate are useful as film-forming materials and can be polymerized either on the liquid surface or the support by heating. The polymerization is catalyzed by ultraviolet light. Membranes are also produced by this process using conventional polymerization techniques with monomers, including hexamethylene diamine, adipic acid, styrene sulfonic acid, acrylonitrile and cellulose acetate.

EXAMPLE V

Several monolayers of Epon 872 (epoxy resin) are transferred to different supports. Porous Teflon, Nylon and silver supports are used. Once on the support, the film is dried and the coated support is enclosed with a vial of the same resin and an open vial of 1,3 propane diamine in a large container which is then sealed and heated at 50°C. for 24 hours. At the end of that time, the vial containing the epoxy resin is completely crosslinked. This result indicates that the epoxy resin membrane on the supports is also crosslinked.

EXAMPLE VI

Mixtures of Versamid nylon resins (General Mills Versamid resins 100, 115, 125, and 140, commercial polyamides made by the condensation of a fatty acid dimer and diethylene triamine) and Shell's Epon 872 epoxy resin were found to undergo a very slow crosslinking reaction at room temperature. It was found that crosslinking of cast films (3 mil. wet thickness) could be achieved in less than 2 hours at 90–100°C. in a vacuum oven. The films produced were tested for their solubility in xylene and found to be completely insoluble (within the limits of experimental error). The original films were completely soluble in xylene.

An equiweight mixture of Versamid 100 and Epon 872 (26 monolayers) was transferred to a cellulose acetate filter (0.025 pore size) at 8.9 dynes/cm. by the process of this invention. a solution of 0.015g. Versamid 100 and 0.015g. of Epon 872 in 100 ml. benzene was applied to the water surface in an amount of 0.3 ml. The resultant membrane was tested for permeability of air at various pressures. A 40 to 45% reduction of air permeability for the coated filter over the uncoated filter was observed. The membrane was then crosslinked by heating as described above.

A second air permeability test was carried out and a reduction of 8% in the air permeability through the cross-linked membrane over the uncrosslinked membrane was noted This experiment demonstrates the ability to carry out cross-linking of thin films without decreasing their value as membranes.

EXAMPLE VII

Glass plates were dipped into a 5% solution of polyethylene in toluene (50°C.) and were allowed to dry for an hour. The polyethylene covered plates were then covered with 20 monolayers of an equiweight mixture of Versamide 100 and Epon 872. This work was done using the Langmuir-Blodgett technique and the transfer to the polyethylene coated plates was done at a constant pressure of 10 dynes/cm. The plates containing the membrane on polyethylene were then heated to 70° for 2 ½ hours to allow crosslinking. With crosslinking, this membrane became insoluble in chloroform.

After the plates had cooled, the sides were scored. The plate was then lowered into a two phase water-chloroform bath. The chloroform dissolved the polyethylene freeing the membrane which was unripped and whole. This whole process was repeated with another membrane with the same results.

The membrane can be attached to a Type VF or VM Millipore filter.

EXAMPLE VIII

Using the Langmuir-Blodgett technique, an ultrathin XD-1 (a General Electric silicon-polycarbonate resin) membrane was prepared and transferred onto an Amicon XM 100 porous backing material. The membrane was prepared by transferring 20 monolayers of XD-1 from a film balance to an aluminum foil support as in Example 1. The foil was then dipped into concentrated hydrochloric acid which loosened the membrane and allowed it to be floated onto a water surface. This thin film was then picked up from the water surface by the Langmuir-Blodgett technique.

Tests of the membrane showed a twenty-fold decrease in the rate of permeation of dry air over the rate of permeation through an XM 100 blank. In addition, the membrane was used to increase the concentration of trifalgic acid (a large test molecule, formula:

$C_{131}H_{113}N_9Na_{18}O_{33}S_{12}$) from approximately 1% to approximately 8%.

EXAMPLE IX

A membrane approximately 75A thick was produced by depositing 15 monolayers of XD-1 resin onto an aluminum plate using the procedure of Example I. This plate was then dipped into dilute HCl acid and the film was freed. This film, which could be easily seen, was then picked up onto a piece of porous stainless steel using the Langmuir-Blodgett technique.

It is claimed:

1. A method for the production of ultrathin membranes composed of at least one monomolecular layer in which the molecules are oriented, consisting essentially of establishing a monomolecular film of a film-forming material on the surface of a liquid, said film-forming material being selected from polymerizable monomeric or polymeric materials essentially insoluble in the liquid upon which the film is established, said materials containing a chemical group, or groups, having sufficient attraction to the liquid surface to attach the molecules of the material to the surface and a chemical structure which makes the material essentially insoluble in the liquid, and passing a support through the established monomolecular film while maintaining the film at essentially constant surface pressure to thereby deposit on the support a monomolecular layer of the film-forming material, said pressure applied upon the monomolecular film being sufficient to maintain and transfer the film as a continuous phase and insufficient to collapse the film.

2. The method of claim 1 wherein the support is porous.

3. The method of claim 1 wherein said support is solid and further including removing said film from the solid support and attaching it to a porous support to thereby form a composite structure comprising said film and said porous support.

4. The method of claim 1 wherein the liquid is water, the chemical group having attraction to the liquid surface is a hydrophilic chemical group and the chemical structure is a hydrophobic structure.

5. The method of claim 1 wherein the film-forming material is a polymeric material, and further including cross-linking the monomolecular layer on the porous support immediately after application to the support.

6. The method of claim 1 wherein the film-forming material is a polymerizable monomer and further including polymerizing the monomolecular layer of monomer upon the surface of the liquid.

7. The method of claim 1 wherein the film-forming material is a polymeric material, and further including cross-linking the monomolecular layer on the surface of the liquid.

8. The method of claim 1 wherein the film-forming material includes a compound capable of increasing the collapse pressure of the monomolecular film, said compound having a long chain hydrocarbon structure with a strong polar group at one extremity.

9. An ultrathin membrane prepared by the method of claim 1 comprising a plurality of separate layers of a polymeric material, each layer being one or two molecules thick and the molecules in each layer being oriented so that each layer has a regular structure, said membrane being on the order of 0.01 to 0.001 $\mu$ thick and having an essentially continuous surface.

10. The membrane of claim 9 wherein the polymeric material has a hydrophobic structure containing at least one hydrophilic chemical group, each said layer having the molecules therein arranged with the hydrophilic chemical group oriented essentially in the same direction with respect to the adjacent layer.

11. The ultrathin membrane of claim 10 wherein the molecules in each layer are oriented in the same or alternating directions.

12. The ultrathin membrane of claim 9 wherein the polymeric material is cross-linked.

13. A composite structure consisting of an ultrathin membrane comprising a plurality of separate layers of a polymeric material, each layer being one or two molecules thick and the molecules in each layer being oriented so that each layer has a regular structure, said membrane being on the order of 0.01 to 0.001 $\mu$ thick and having an essentially continuous surface attached to a porous support, the pores of which are of a size effective to support the membrane and larger than 25A in diameter.

14. A method for the production of ultrathin membranes composed of separate monomolecular layers in each layer of which the molecules are oriented, consisting essentially of establishing a monomolecular film of a film-forming material on the surface of a liquid, said film-forming material being selected from polymerizable monomeric or polymeric materials essentially insoluble in the liquid upon which the film is established, said materials containing a chemical group, or groups, having sufficient attraction to the liquid surface to attach the molecules of the material to the surface and a chemical structure which makes the material essentially insoluble in the liquid, and passing a support through the established monomolecular film while maintaining the film at essentially constant surface pressure to thereby deposit on the support a monomolecular layer of the film-forming material, said pressure applied upon the monomolecular film being sufficient to maintain the film as a continuous phase and insufficient to collapse the film and thereafter repeatedly passing the support through the monomolecular film at constant pressure a desired number of times to produce an ultrathin membrane comprising a plurality of monomolecular layers of the film-forming material.

15. The method of claim 14 wherein the support is porous.

16. The method of claim 14 wherein said support is solid and further including removing said film from the solid support and attaching it to a porous support to thereby form a composite structure comprising said film and said porous support.

17. The method of claim 14 wherein the liquid is water, the chemical group having attraction to the liquid surface is a hydrophilic chemical group and the chemical structure is a hydrophobic structure.

18. The method of claim 14 further including heating the porous support and the monomolecular layers thereon after each passage of the support through the monomolecular film at a temperature and for a time sufficient to dry each monomolecular layer before the support is passed through the film to apply a succeeding layer.

19. The method of claim 14 wherein the film-forming material is a polymeric material, and further including cross-linking each monomolecular layer on the porous support immediately after it is applied to the support.

20. The method of claim 14 wherein the film-forming material is a polymerizable monomer and further including polymerizing the monomolecular layer of monomer upon the surface of the liquid.

21. The method of claim 14 wherein the film-forming material is a polymeric material, and further including cross-linking the monomolecular layer on the surface of the liquid.

22. The method of claim 14 wherein the film-forming material includes a compound capable of increasing the collapse pressure of the monomolecular film, said compound having a long chain hydrocarbon structure with a strong polar group at one extremity.

* * * * *